(12) United States Patent
Ye et al.

(10) Patent No.: US 12,391,185 B2
(45) Date of Patent: Aug. 19, 2025

(54) BACK DOOR FOR VEHICLE AND VEHICLE

(71) Applicants: ZHEJIANG LIANKONG TECHNOLOGIES CO., LTD, Zhejiang (CN); ZHEJIANG GEELY HOLDING GROUP CO., LTD, Zhejiang (CN)

(72) Inventors: An Ye, Ningbo (CN); Meng Jiang, Ningbo (CN)

(73) Assignees: ZHEJIANG LIANKONG TECHNOLOGIES CO., LTD, Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 371 days.

(21) Appl. No.: 17/999,733

(22) PCT Filed: May 25, 2020

(86) PCT No.: PCT/CN2020/092151
§ 371 (c)(1),
(2) Date: Nov. 23, 2022

(87) PCT Pub. No.: WO2021/237420
PCT Pub. Date: Dec. 2, 2021

(65) Prior Publication Data
US 2023/0234513 A1    Jul. 27, 2023

(51) Int. Cl.
*B60R 5/04* (2006.01)
*B60J 5/10* (2006.01)
*B60R 13/02* (2006.01)

(52) U.S. Cl.
CPC .......... *B60R 5/044* (2013.01); *B60R 13/0243* (2013.01); *B60J 5/107* (2013.01)

(58) Field of Classification Search
CPC .......... B60R 5/04; B60R 5/044; B60R 5/045; B60R 13/0243; B60R 13/0206;
(Continued)

(56) References Cited

U.S. PATENT DOCUMENTS

| 4,202,578 | A  | * | 5/1980 | Roullier | ................. | B60R 5/044 |
| | | | | | | 296/37.16 |
| 8,172,296 | B2 | * | 5/2012 | Umeda | .................... | B60R 5/045 |
| | | | | | | 296/37.16 |

(Continued)

FOREIGN PATENT DOCUMENTS

| CN | 101400902 A | 4/2009 |
| CN | 102245436 A | 11/2011 |

(Continued)

OTHER PUBLICATIONS

Office Action for Japanese Patent Application No. 2022-570491 dated Nov. 7, 2023 (10 pages with English translation).
(Continued)

*Primary Examiner* — Daniel J Colilla
(74) *Attorney, Agent, or Firm* — Westbridge IP LLC

(57) ABSTRACT

Disclosed are a back door for a vehicle and a vehicle. The back door for a vehicle includes: a back door trim panel and a rear shielding plate which is provided with a first side edge, a second side edge, a third side edge and a fourth side edge that are sequentially connected; the first side and the third side edge are each connected to the back door trim panel in a non-rotatable manner; and the second side edge is used for being in lap joint with a front shielding plate. The rear shielding plate moves along with the back door when the back door is opened; and when the back door is closed, the rear shielding plate is in lap joint with the front shielding plate, to form a shielding plate of the luggage compartment.

3 Claims, 6 Drawing Sheets

(58) Field of Classification Search
CPC .......... B60R 13/0268; B60R 2011/0036; B60J 5/107; B60J 5/10; B62D 25/087; F16B 21/02; F16B 21/09
USPC ..... 296/24.43, 24.44, 37.16, 37.1, 76, 146.7
See application file for complete search history.

(56) References Cited

U.S. PATENT DOCUMENTS

| | | | |
|---|---|---|---|
| 8,262,333 | B2 | 9/2012 | Bücker et al. |
| 8,585,121 | B2 | 11/2013 | Marx et al. |
| 8,979,169 | B2 | 3/2015 | Marx et al. |
| 10,800,336 | B2 * | 10/2020 | Causemann ............ B60R 5/045 |
| 2010/0272540 | A1 * | 10/2010 | Bucker ................. F16B 21/086 411/549 |
| 2011/0057467 | A1 * | 3/2011 | Umeda .................. B60R 5/045 296/37.8 |
| 2011/0241372 | A1 * | 10/2011 | Kusu ..................... B60R 5/048 296/37.16 |
| 2011/0302765 | A1 * | 12/2011 | Marx ..................... F16B 21/02 403/49 |
| 2017/0305475 | A1 | 10/2017 | Padmanabhan |
| 2018/0147994 | A1 * | 5/2018 | Tacey ..................... B60R 5/045 |
| 2019/0032696 | A1 * | 1/2019 | Sbongk ................. F16B 21/086 |
| 2024/0218710 | A1 * | 7/2024 | Huang .................... B60J 9/02 |

FOREIGN PATENT DOCUMENTS

| | | |
|---|---|---|
| CN | 102310819 A | 1/2012 |
| CN | 202557264 U | 11/2012 |
| CN | 202986977 U | 6/2013 |
| CN | 109305112 A | 2/2019 |
| DE | 19934198 A1 | 3/2001 |
| DE | 102 23 685 B4 | 11/2010 |
| EP | 0061928 B1 | 2/1986 |
| JP | S51-039683 U | 3/1976 |
| JP | S52-131239 U | 10/1977 |
| JP | S 62149532 A | 7/1987 |
| JP | H02-118986 | 5/1990 |
| JP | H04-075208 | 3/1992 |
| JP | H 0567460 B2 | 9/1993 |
| JP | H 1148870 A | 2/1999 |
| JP | 2002-036957 A | 2/2002 |
| JP | 2006-225841 | 8/2006 |
| JP | 2009-209437 A | 9/2009 |
| JP | 2011-057008 A | 3/2011 |
| KR | 20110091897 A | 8/2011 |
| WO | WO 2010/066404 | 6/2010 |

OTHER PUBLICATIONS

Notice of Reasons for Refusal issued in counterpart Japanese Patent Application No. JP 2022-570491, dated May 28, 2024.
Request for the Submission of an Opinion issued in counterpart Korean Patent Application No. KR 10-2022-7041175, dated Jun. 20, 2024.
1st Office Action for China Patent Application No. 202080098619.4 dated May 5, 2023 (6 pages).
2nd Office Action for China Patent Application No. 202080098619.4 dated Aug. 11, 2023 (10 pages).
1st Search Report for China Patent Application No. 202080098619.4 dated May 25, 2020 (3 pages).
1st Office Action for EP Patent Application No. 20937547.6 dated May 26, 2023 (6 pages).
Supplementary European Search Report for EP Patent Application No. 20937547.6 dated May 15, 2023 (4 pages).
International Search Report and Written Opinion for PCT/CN2020/092151 (ISA/CA) mailed Feb. 24, 2021 (11 pages).

* cited by examiner

BACK DOOR FOR VEHICLE AND VEHICLE

TECHNICAL FIELD

The present disclosure relates to the technical field of vehicles, and in particular to a back door for a vehicle and a vehicle.

BACKGROUND

In order to provide use convenience for a user, a package tray, i.e., a shielding plate, is designed in an automobile luggage compartment. The shielding plate is widely applied to various passenger cars and mounted in the automobile luggage compartment. The shielding plate can shield light irradiation and prevent articles in the luggage compartment from being seen by external persons through glass on the luggage compartment. The shielding plate can also hold articles, so as to fully and reasonably utilize the storage space of the luggage compartment.

The common vehicle only has a fixed shielding plate, or a two-section shielding plate. The shielding plate of the common coupe sport utility vehicle (SUV) is divided into two foldable sections, of which a front portion is fixed and two sides of a rear portion are hung on a back door side protection plate by means of a hanging rope structure. When the back door is opened, the foldable portion of the shielding plate rises. However, when articles are placed on the fixed section, it is inconvenient for such a designed structure to take or place articles on the fixed section, and it is likely to generate abnormal sound in the driving process, affecting driving experience. Extendable shielding curtains in luggage compartments are designed in some other automobiles, but the shielding curtains have to be rolled or unrolled to take or place articles in the luggage compartments every time, resulting in inconvenience. The shielding curtains have low strength, and cannot hold heavy articles, resulting in waste of the space of the luggage compartments and unattractiveness.

SUMMARY

The technical problem to be solved by the present disclosure is that it is inconvenient to take or place articles due to connection design of an existing shielding plate and a vehicle.

In order to solve the above technical problem, in a first aspect, an embodiment of the present application discloses a back door for a vehicle. The back door for a vehicle includes: a back door trim panel and a rear shielding plate, where
  the rear shielding plate is provided with a first side edge, a second side edge, a third side edge and a fourth side edge that are sequentially connected, the first side edge is opposite the third side edge, and the second side edge is opposite the fourth side edge;
  the first side edge and the third side edge are each connected to the back door trim panel in a non-rotatable manner; and
  the second side edge is used for being in lap joint with a front shielding plate arranged in a luggage compartment of the vehicle, to form a shielding plate of the luggage compartment.

Further, a first connecting surface is delimited by a contour line of the rear shielding plate, a second connecting surface is delimited by a contour line of the back door trim panel, and the first connecting surface and the second connecting surface are arranged at a preset included angle.

Further, the first side edge and the third side edge are each detachably connected to the back door trim panel.

Further, the back door trim panel includes a window frame trim panel, the first side edge and the third side edge being each connected to the window frame trim panel.

Further, the first side edge and the third side edge are each connected to the window frame trim panel by means of a first connector; and
  the first connector includes a connecting plate, a supporting member and a fastener, the connecting plate being connected to the rear shielding plate, one end of the supporting member being connected to the connecting plate, and the fastener fixing the other end of the supporting member on the window frame trim panel.

Further, the supporting member is a supporting sheet, and the supporting sheet has a laterally bent portion.

Further, the back door trim panel further includes a back door protection plate, the fourth side edge being connected to the back door protection plate.

Further, the fourth side edge is connected to the back door protection plate by means of a second connector; and
  the second connector includes a rotary handle and a support, the rotary handle including a handle portion and a limiting portion,
  one end of the support being connected to the rear shielding plate, a through hole being provided on the other end of the support, and
  the limiting portion penetrating the through hole, to be connected to the back door protection plate.

Further, a limiting groove is provided on the back door protection plate, the limiting portion being clamped in the limiting groove.

Further, the second connector further includes a rotary baffle, the rotary baffle abutting against the back door protection plate; and
  a connecting hole is provided on the back door protection plate, a limiting hole is provided on the rotary baffle, and the limiting portion penetrates the connecting hole, to be clamped in the limiting hole.

Further, a mistake proofing structure is arranged on a side surface of the rotary baffle away from the back door protection plate.

Further, the connecting hole includes a hole diameter enlargement portion and a hole diameter reduction portion, the hole diameter enlargement portion having a hole diameter greater than a maximum size of the rotary baffle, and the hole diameter reduction portion has a hole diameter less than the maximum size of the rotary baffle.

Further, a limiting rib is arranged on a surface of the back door protection plate abutting against the rotary baffle, and the limiting rib is arranged on an edge of the connecting hole.

In a second aspect, an embodiment of the present application discloses a vehicle. The vehicle includes a luggage compartment and a back door for the vehicle, where
  a front shielding plate is arranged in the luggage compartment;
  the back door for the vehicle includes a back door trim panel and a rear shielding plate,
  the rear shielding plate being provided with a first side edge, a second side edge, a third side edge and a fourth side edge that are sequentially connected, the first side edge being opposite the third side edge, the second side edge being opposite the fourth side edge, the first side edge and the third side edge being each connected to the back door trim panel in a non-rotatable manner, a first connecting surface being delimited by a contour line of the rear shielding plate, a second connecting surface being delimited by a contour line of the back door trim panel, and the first connecting surface and the second connecting surface being arranged at a preset included angle;

when the back door for the vehicle is closed, the second side edge is in lap joint with the front shielding plate, to form a shielding plate of the luggage compartment; and when the back door for the vehicle is opened, the second side edge is separated from the front shielding plate.

With use of the above technical solution, the back door for a vehicle and the vehicle of the embodiments of the present application have the following beneficial effects:

(1) according to the back door for a vehicle of the embodiment of the present application, the rear shielding plate is connected and fixed to the back door; when the back door is opened, the rear shielding plate and the back door move integrally, and articles in the luggage compartment and on the front shielding plate may be directly taken or placed without operating the shielding plate, so as to satisfy a requirement for taking the articles; and when the back door is closed, the rear shielding plate is in lap joint with the front shielding plate, to form the shielding plate of the luggage compartment, so as to satisfy a requirement for shielding the articles in the luggage compartment;

(2) according to the back door for a vehicle of the embodiment of the present application, the rear shielding plate is detachably connected to the back door trim panel, to facilitate disassembly and assembly of the rear shielding plate;

(3) according to the back door for a vehicle of the embodiment of the present application, the rear shielding plate is connected to the back door trim panel by means of the first connector and the second connector, connection reliability may be ensured without designing a complex connecting structure, aesthetics and sensory quality requirements are ensured, and moreover, maintenance and replacement of the rear shielding plate are facilitated; and the number of parts of the first connector and the second connector is small, such that use cost is low; and (4) according to the back door for a vehicle of the embodiment of the present application, the second connector uses a form of a knob limiting structure, to connect the fourth side edge of the rear shielding plate to the back door protection plate, and when the rear shielding plate needs to be disassembled and assembled, the fourth side edge of the rear shielding plate may be disassembled by means of the rotary handle, thereby ensuring fixed reliability of the rear shielding plate and operability thereof during disassembly and assembly.

BRIEF DESCRIPTION OF THE DRAWINGS

In order to more clearly illustrate technical solutions in embodiments of the present application, a brief introduction to the accompanying drawings required for the description of the embodiments will be provided below. Obviously, the accompanying drawings in the following description are only some embodiments of the present application, and those of ordinary skill in the art would also be able to derive other accompanying drawings from these accompanying drawings without making creative efforts.

The figures are supplementarily described below.

Figure 1:
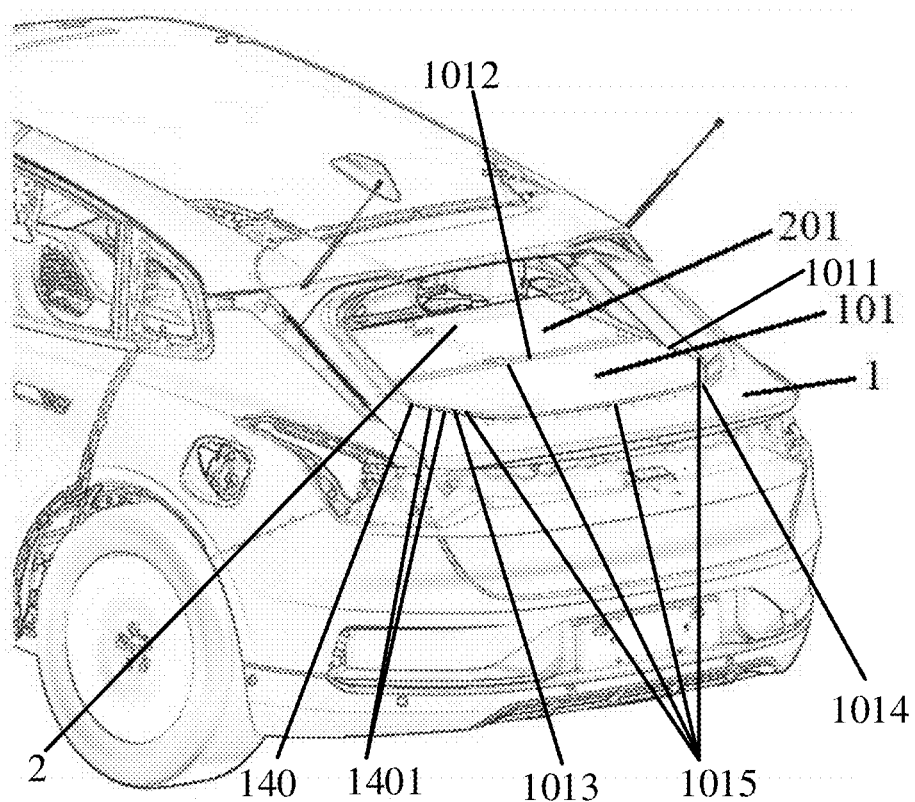
FIG. 1 is a structural schematic diagram of a connection of a shielding plate of a luggage compartment when a back door for a vehicle of an embodiment of the present application is closed.

1—back door; 101—rear shielding plate; 102—window frame trim panel; 110—first connector; 111—connecting plate; 112—supporting member; 113—fastener; 120—second connector; 121—rotary handle; 122—support; 123—rotary baffle; 130—back door protection plate; 131—connecting hole; 132—limiting rib; 201—front shielding plate; 1011—first side edge; 1012—second side edge; 1013—third side edge; 1014—fourth side edge; 1015—first connecting surface; 140—back door trim panel; 1401—second connecting surface; 2—luggage compartment.

DETAILED DESCRIPTION OF THE EMBODIMENTS

The technical solutions in embodiments of the present application will be clearly and completely described below in combination with the accompanying drawings in the embodiments of the present application. Apparently, the embodiments described are merely some rather than all of the embodiments of the present application. Based on the embodiments of the present application, all other embodiments obtained by those of ordinary skill in the art without making creative efforts fall within the scope of protection of the present application.

"An embodiment" or "embodiments" herein refer to specific features, structures or characteristics that may be included in at least one implementation of the present application. In the description of the present application, it needs to be understood that the orientation or positional relations indicated by the terms "up", "down", "top", "bottom", etc. are based on the orientation or positional relations shown in the accompanying drawings, are merely for facilitating the description of the present application and simplifying the description, rather than indicating or implying that a device or element referred to must have a particular orientation or be constructed and operated in a particular orientation, and therefore will not be interpreted as limiting the present application. In addition, the terms "first", "second", etc. are for descriptive purposes only and are not to be construed as indicating or implying their relative importance or implicitly specifying the number of indicated technical features. Thus, a feature defined with "first" and "second" may explicitly or implicitly include one or more of the features. Moreover, the terms "first", "second", etc. are used to distinguish similar objects, but are not necessarily used to describe a specific sequence or a precedence order. It should be understood that data used in this way may be interchanged where appropriate, such that the embodiments of the present application described herein may be implemented in other sequences than those illustrated or described herein.

In the prior art, a shielding plate of some common coupe sport utility vehicles (SUV) is divided into two foldable sections, of which a front portion is fixed and two sides of a rear portion are hung on a back door side protection plate by means of a hanging rope structure. When the back door is opened, the foldable portion of the shielding plate rises. It is inconvenient for such a structure to take or place articles on the fixed section, and it is likely to generate abnormal sound in the driving process. Therefore, connection reliability and operation convenience of the shielding plate and a vehicle body are problems needing to be solved.

Figure 2:
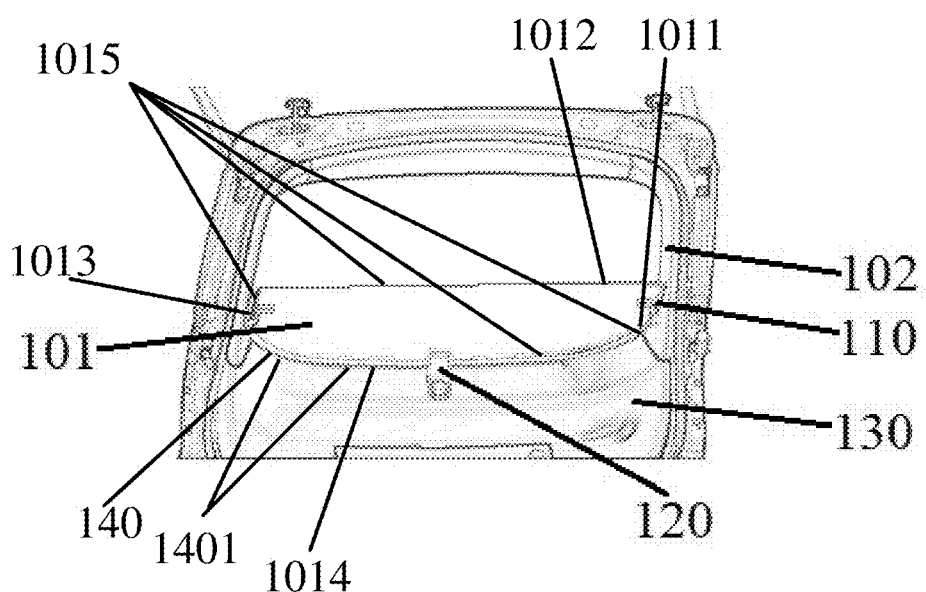
FIG. 2 is a structural schematic diagram of a back door for a vehicle of an embodiment of the present application.

As shown in FIGS. 1 and 2, an embodiment of the present application discloses a back door 1 for a vehicle. The back door for a vehicle includes: a back door trim panel 140 and a rear shielding plate 101, where the rear shielding plate 101 is provided with a first side edge 1011, a second side edge 1012, a third side edge 1013 and a fourth side edge 1014 that are sequentially connected, the first side edge 1011 is opposite the third side edge 1013, and the second side edge 1012 is opposite the fourth side edge 1014; the first side edge 1011 and the third side edge 1013 are each connected to the back door trim panel 140 in a non-rotatable manner; and the second side edge 1012 is used for being in lap joint with a front shielding plate 201 arranged in a luggage compartment 2 of the vehicle, to form a shielding plate of the luggage compartment 2.

According to the back door 1 for a vehicle of the embodiment of the present application, the rear shielding plate 101 is connected and fixed to the back door 1; when the back door 1 is opened, the rear shielding plate 101 and the back door 1 move integrally, and articles in the luggage compartment 2 and on the front shielding plate 201 may be directly taken or placed without operating the shielding plate, so as to satisfy a requirement for taking the articles; and when the back door 1 is closed, the rear shielding plate 101 is in lap joint with the front shielding plate 201 together to form the shielding plate of the luggage compartment 2, so as to satisfy a requirement for shielding the articles in the luggage compartment 2, and the articles may be placed on the shielding plate of the luggage compartment 2, such that a space of the luggage compartment 2 may be fully utilized.

As shown in FIG. 2, in an embodiment of the present application, a rear shielding plate 101 is made of a rigid plate, such as a plastic plate, a metal plate, or a composite plate. Preferably, the rear shielding plate 101 is made of a material having low manufacturing cost and light weight. The rear shielding plate 101 is a quadrilateral or approximately quadrilateral plane plate, two side edges, i.e., the first side edge 1011 and the third side edge 1013, at sides of the rear shielding plate are connected and fixed to the back door trim panel 140 on the back door 1 respectively, and the rear shielding plate 101 is stably connected to the back door trim panel 140 in a non-rotatable manner. Optionally, the rear shielding plate 101 is connected to the back door trim panel 140 in a bonded manner. Optionally, the rear shielding plate 101 is connected to the back door trim panel 140 in a multi-point riveted or multi-point screwed manner. In some embodiments, the rear shielding plate 101 may alternatively be another polygonal plate-like component, and any side edge of the rear shielding plate 101 is connected to the back door trim panel 140 together to enable the rear shielding plate 101 to move integrally along with the back door 1. In the embodiment of the present application, the front shielding plate 201 is fixed in the luggage compartment 2 of the vehicle, the front shielding plate 201 may have the same shape as the rear shielding plate 101. Optionally, the front shielding plate 201 and the rear shielding plate 101 are both quadrilateral or approximately quadrilateral plane plates. Alternatively, the front shielding plate 201 may have a different shape from the rear shielding plate 101, and optionally, the front shielding plate 201 is quadrilateral, and the rear shielding plate 101 is approximately trilateral. The material of the front shielding plate 201 and the material of the rear shielding plate may be the same or different. Optionally, the front shielding plate 201 and the rear shielding plate 101 are both made of composite plates. Optionally, the front shielding plate 201 is a composite plate, and the rear shielding plate 101 is a plastic plate. A thickness of the front shielding plate 201 and a thickness of the rear shielding plate may be the same or different, and the thicknesses of the front shielding plate 201 and the rear shielding plate 101 are determined according to required strength and respective selected materials. With a direction of a vehicle tail being taken as the rear, a front edge, i.e., the second side edge 1012, of the rear shielding plate 101 is attached to a rear edge of the front shielding plate 201 together. Specifically, an upper surface of the rear edge of the front shielding plate 201 is attached to a lower surface of the front edge of the rear shielding plate 101, and there is no elastic force between the upper surface and the lower surface. In some embodiments, interference between the upper surface of the rear edge of the front shielding plate 201 and the lower surface of the front edge of the rear shielding plate 101 may also exist to a certain extent, that is, there is an elastic force between the two attached surfaces.

A first connecting surface 1015 is delimited by a contour line of the rear shielding plate 101, a second connecting surface 1401 is delimited by a contour line of the back door trim panel 140, and the first connecting surface 1015 and the second connecting surface 1401 are arranged at a preset included angle.

In the embodiment of the present application, as shown in FIG. 1, there is a certain included angle between contour surfaces of the rear shielding plate and the back door trim panel 140 after the rear shielding plate 101 and the back door trim panel 140 are connected and fixed, and setting of the included angle depends on a shape, an inclination angle, etc. of the rear shielding plate 101 and the back door trim panel 140, so as to enable the rear shielding plate 101 to be in lap joint with the front shielding plate 201 when the back door 1 is closed. Optionally, the rear shielding plate 101 is obliquely lapped on the front shielding plate 201, and the rear shielding plate 101 and the front shielding plate 201 are not on the same horizontal plane; and preferably, a proper included angle is selected, such that the rear shielding plate 101 and the front shielding plate 201 form a plane, and the plane is a plane of the shielding plate of the luggage compartment 2.

The first side edge 1011 and the third side edge 1013 are each detachably connected to the back door trim panel 140.

In the embodiment of the present application, the rear shielding plate 101 is preferably detachably connected to the back door trim panel 140, such that a user may conveniently disassemble and take down the rear shielding plate 101 according to requirements, and optionally, the rear shielding plate 101 is connected to the back door trim panel 140 in a screw connection or clamping connection manner.

The back door trim panel 140 includes a window frame trim panel 102, and the first side edge 1011 and the third side edge 1013 are each connected to the window frame trim panel 102.

As shown in FIG. 2, in the embodiment of the present application, the back door trim panel 140 is composed of a plurality of trim panels, the trim panel arranged in a window area of the back door 1 is the window frame trim panel 102, the window frame trim panel 102 is arranged at a periphery of rear window glass mounted on the back door 1, and the first side edge 1011 and the third side edge 1013 of the rear shielding plate 101 are each connected to the window frame trim panel 102 on two sides of the rear window respectively. In some embodiments, the first side edge 1011 and the third side edge 1013 may alternatively be connected to the window frame trim panel 102 below the rear window.

The first side edge 1011 and the third side edge 1013 are each connected to the window frame trim panel 102 by means of a first connector 110; and the first connector 110 includes a connecting plate 111, a supporting member 112 and a fastener 113, the connecting plate 111 being connected to the rear shielding plate 101, one end of the supporting member 112 being connected to the connecting plate 111, and the fastener 113 fixing the other end of the supporting member 112 on the window frame trim panel 102.

Figure 3:
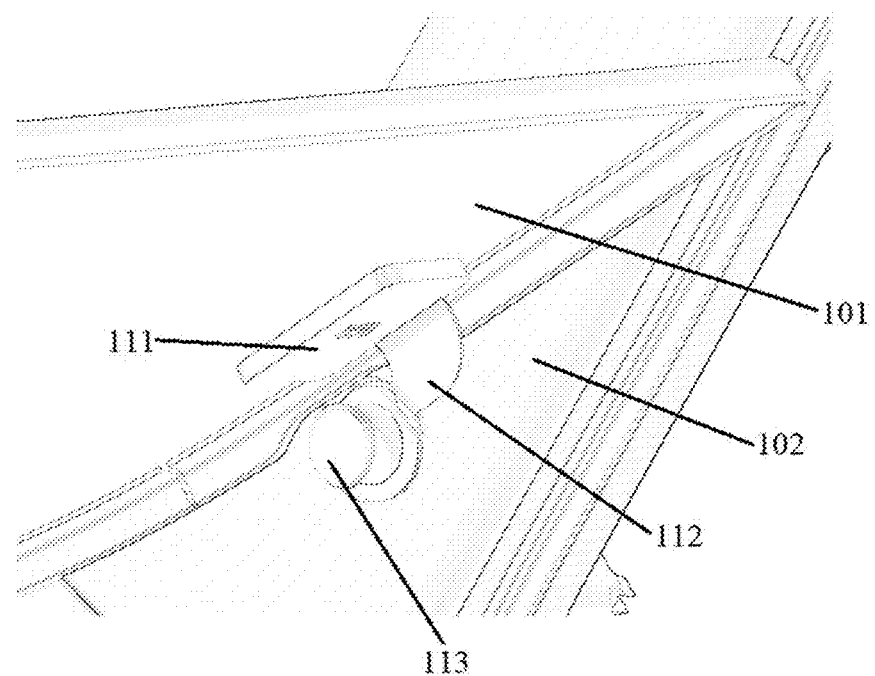
FIG. 3 is a structural schematic diagram of a first connector of an embodiment of the present application.

In the embodiment of the present application, the rear shielding plate 101 is detachably connected to the window frame trim panel 102 by means of the first connector 110, and the first connector 110 may be made of a plastic member material in order to ensure light weight of a vehicle body and reduce cost. As shown in FIG. 3, the connecting plate 111 is thermally bonded to the rear shielding plate 101, one end of the supporting member 112 is connected to the connecting plate 111, and the other end of the supporting member is connected by means of the fastener 113 without the window frame trim panel 102. Optionally, the supporting member 112 is a supporting rod or a supporting sheet, and the fastener 113 is a fastening screw, etc. In some embodiments, the first connector 110 may alternatively be made of a metal material.

The supporting member 112 is a supporting sheet, and the supporting sheet has a laterally bent portion.

As shown in FIG. 3, in the embodiment of the present application, one end of the supporting sheet is connected to the connecting plate 111 in a bonded or integral formed manner, and the other end of the supporting sheet is provided with a through hole and is connected to the window frame trim panel 102 by means of a screw. The connecting plate 111 is bonded to a back surface of the rear shielding plate 101, and a joint between the supporting sheet and the connecting plate 111 is slightly close to an inner side relative to the window frame trim panel 102, such that an outward lateral bent portion is designed on the supporting sheet, to connect the supporting sheet to the window frame trim panel 102, and the situation that a long supporting member 112 used occupies large space and affects connecting strength is avoided. In some implementations, a clamping groove is provided on the window frame trim panel 102, and the supporting sheet may also be connected to the window frame trim panel 102 in a clamped manner.

The back door trim panel 140 further includes a back door protection plate 130, the fourth side edge 1014 being connected to the back door protection plate 130.

Figure 5:
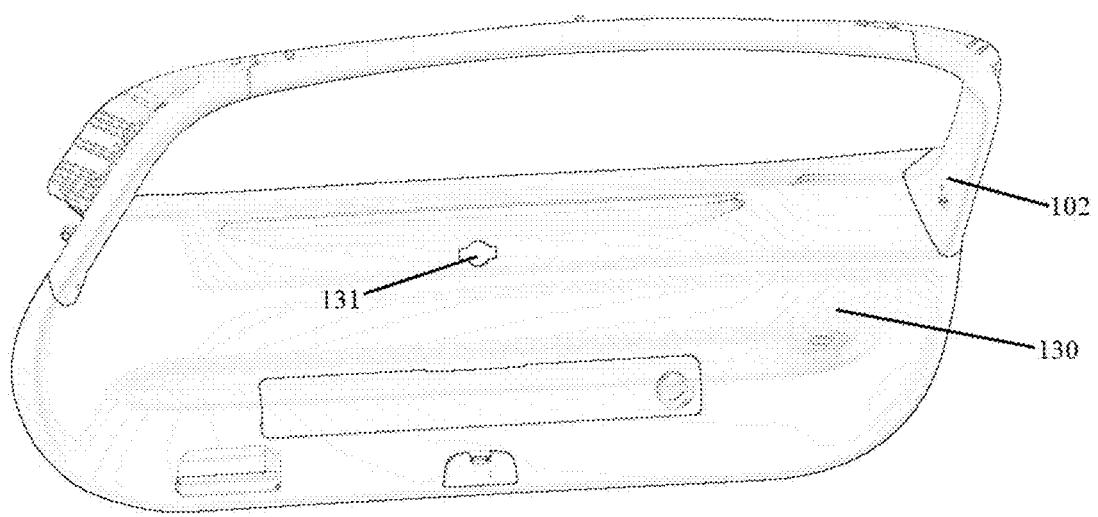
FIG. 5 is a structural schematic diagram of a back door trim panel of an embodiment of the present application.

In the embodiment of the present application, as shown in FIG. 5, the back door protection plate 130 is arranged below the window frame trim panel 102. As shown in FIG. 2, the rear shielding plate 101 is fixed on the back door 1 in a manner of three-point connection. The first side edge 1011 and the third side edge 1013 of the rear shielding plate 101 are each connected to the window frame trim panel 102, and the fourth side edge 1014 of the rear shielding plate is connected to the back door protection plate 130. Optionally, the fourth side edge 1014 of the rear shielding plate is connected to the back door protection plate 130 in a screwed manner, a bonded manner, etc.

The fourth side edge 1014 is connected to the back door protection plate 130 by means of a second connector 120; and the second connector 120 includes a rotary handle 121 and a support 122, the rotary handle 121 includes a handle portion and a limiting portion, one end of the support 122 is connected to the rear shielding plate 101, a through hole is provided on the other end of the support 122, and the limiting portion penetrates the through hole, to be connected to the back door protection plate 130.

Figure 4:
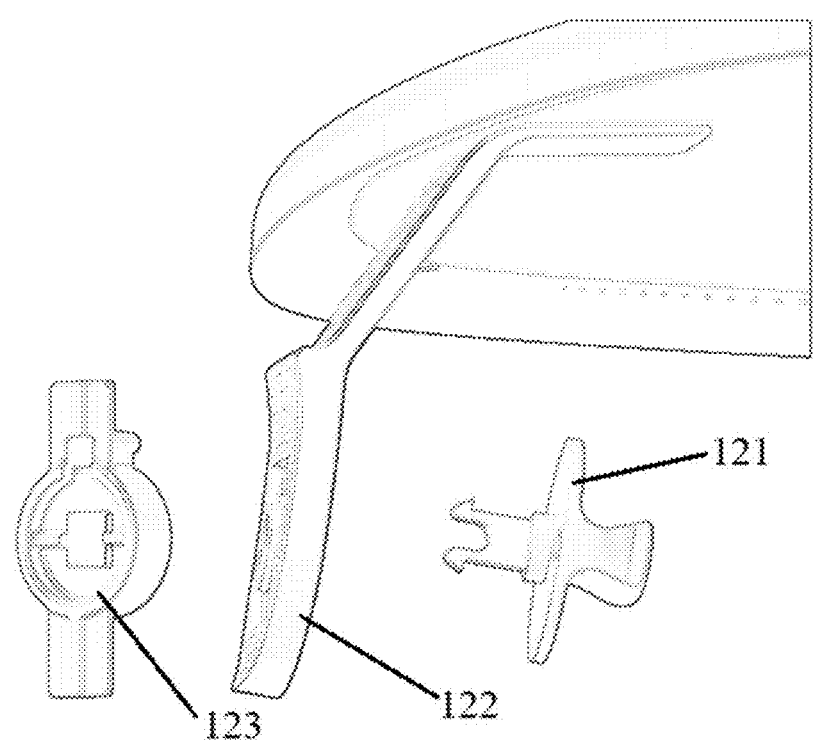
FIG. 4 is a structural schematic diagram of a second connector of an embodiment of the present application.

As shown in FIG. 4, in an embodiment of the present application, the rear shielding plate 101 is detachably connected to the back door protection plate 130 by means of the second connector 120. One end of the rotary handle 121 is the handle portion, and the handle portion is a handheld portion when the second connector 120 is assembled or disassembled; and the other end of the rotary handle 121 is the limiting portion, which is used for being fixed to the back door protection plate 130. The support 122 is a sheet material or a rod member having one or more bent portions, one end of the support 122 is connected to the rear shielding plate 101 in a bonded or screwed manner, the through hole is provided on the other end of the support, and the limiting portion of the rotary handle 121 may penetrate the through hole, to fix the support 122. In some embodiments, the rotary handle 121 is consistent with a structure of an opening rotating button of a cover plate of the back door 1, such that appearance is more attractive.

A limiting groove is provided on the back door protection plate 130, the limiting portion being clamped in the limiting groove.

In the embodiment of the present application, the limiting portion of the rotary handle 121 is directly connected to the back door protection plate 130, the limiting portion is a clamped protrusion, the limiting groove or a limiting hole for clamping is provided on the back door protection plate 130, and the limiting portion matches the limiting groove or the limiting hole, to realize the clamped connection of the limiting portion and the back door protection plate 130. In some embodiments, the limiting portion may alternatively be a nail head portion having threads, a threaded hole is provided on the back door protection plate 130, and the limiting portion is connected to the back door protection plate 130 in a screwed manner.

As shown in FIG. 4, the second connector 120 further includes a rotary baffle 123, the rotary baffle 123 abutting against the back door protection plate 130; and a connecting hole 131 is provided on the back door protection plate 130, a limiting hole is provided on the rotary baffle 123, and the limiting portion penetrates the connecting hole 131, to be clamped in the limiting hole.

Figure 6:
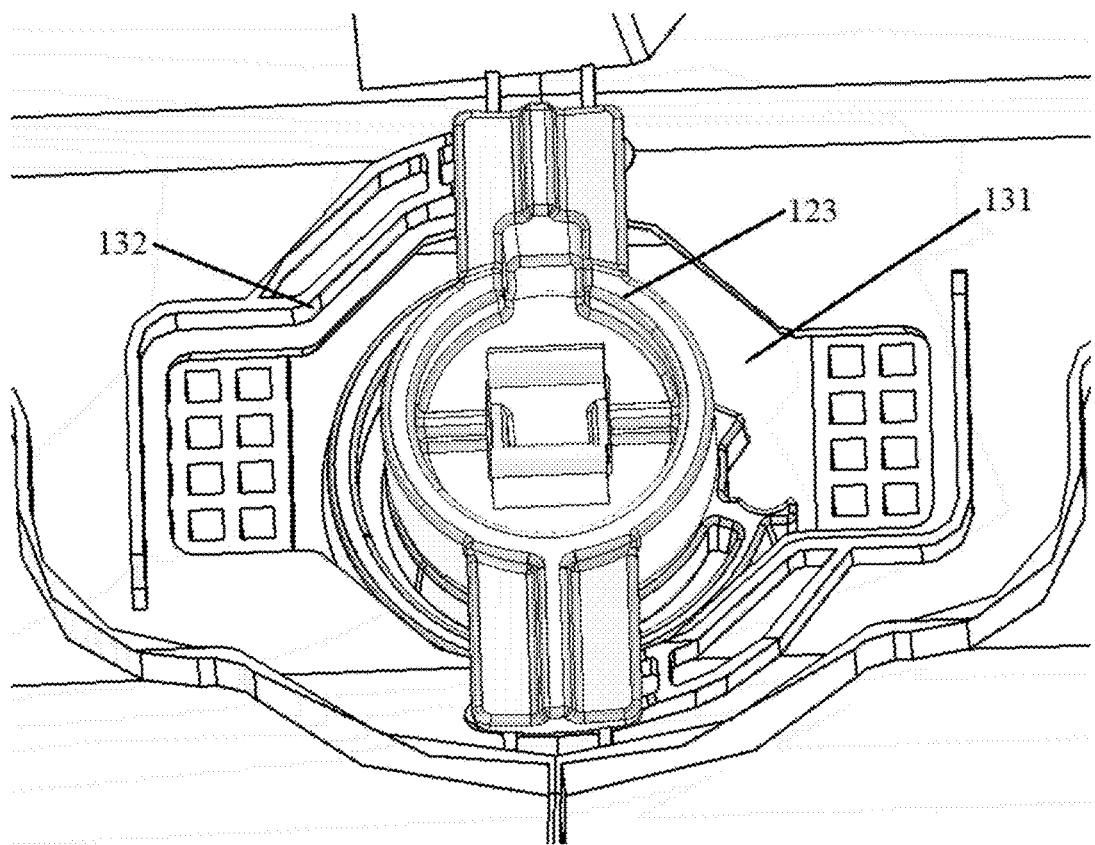
FIG. 6 is a structural schematic diagram of a matching structure of a rotary baffle and a connecting hole of an embodiment of the present application.

In the embodiment of the present application, as shown in FIG. 4, the limiting portion of the rotary handle 121 is connected to the rotary baffle 123, to fix the support 122. The limiting groove or the limiting hole for clamping is provided on the rotary baffle 123, and the limiting portion is clamped to the rotary baffle 123. For example, a triangular hole or a square hole is provided on the rotary baffle 123, and the limiting portion is a triangular or square protrusion matching the limiting hole, which match each other to achieve clamping. As shown in FIGS. 5 and 6, during connection and fixation, a limiting portion of a rotary handle 121 sequentially penetrates a through hole on a support 122 and a connecting hole 131 on a back door protection plate 130, and then the limiting portion is connected to a rotary baffle 123 arranged on a back surface of a back door protection plate 130. In some embodiments, a limiting portion may be further a nail head portion having threads, a threaded hole is provided on a rotary baffle 123, and the limiting portion is connected to the rotary baffle 123 in a screwed manner.

A mistake proofing structure is arranged on a side surface of the rotary baffle 123 away from the back door protection plate 130.

In the embodiment of the present application, as shown in FIG. 6, one surface of the rotary baffle 123 abuts against the back door protection plate 130, the mistake proofing structure for identifying a front surface and a back surface of the rotary baffle 123 is arranged on the other surface of the rotary baffle, and the mistake proofing structure may prevent the rotary handle 121 from being reversely mounted during assembly. Optionally, the mistake proofing structure is a protrusion arranged on a side surface of the rotary baffle 123 away from the back door protection plate 130. Optionally, in order to satisfy a sensory quality requirement of a user, the protrusion is arranged on an edge of the limiting hole, and may be arranged in a radial direction of the limiting hole.

The connecting hole 131 includes a hole diameter enlargement portion and a hole diameter reduction portion, the hole diameter enlargement portion has a hole diameter greater than a maximum size of the rotary baffle 123, and the hole diameter reduction portion has a hole diameter less than the maximum size of the rotary baffle 123.

In the embodiment of the present application, as shown in FIGS. 5 and 6, the connecting hole 131 is a through hole, the rotary baffle 123 blocks one side of a rear protection plate of the back door 1, and when the rotary baffle needs to be disassembled, the rotary baffle 123 may be taken out through the connecting hole 131, therefore a part of an area of the connecting hole 131 has the hole diameter greater than the size of the rotary baffle 123, and a part of an area of the connecting hole has the hole diameter less than the size of the rotary baffle 123.

A limiting rib 132 is arranged on a surface of the back door protection plate 130 abutting against the rotary baffle 123, and the limiting rib 132 is arranged on an edge of the connecting hole 131.

In the embodiment of the present application, as shown in FIG. 6, the rotary baffle 123 abuts against the back door protection plate 130. In order to prevent connection from shaking caused by circumferential rotation of the rotary baffle 123, the limiting rib 132 is arranged at a part of a circumferential position of the connecting hole 131, to limit a circumferential degree of freedom of the rotary baffle 123. Optionally, the limiting rib may limit reverse rotation of the rotary baffle 123. During disassembly, the handle portion of the rotary handle 121 is rotated, and the rotary handle 121 rotates to drive the rotary baffle 123 to rotate, such that the rotary baffle 123 may be taken out from the hole diameter enlargement position of the connecting hole 131. The back door protection plate 130 does not need to be provided with other complex structures, and as long as the connecting hole 131 is provided on a knob and the knob limiting rib 132 is arranged at a back of the knob, assembly fixation and limiting of the knob may be satisfied. No other redundant parts are needed, the structure is simple, and the rear shielding plate 101 is also convenient to assemble and disassemble.

As shown in FIG. 1, an embodiment of the present application discloses a vehicle. The vehicle includes a luggage compartment 2 and the back door 1 for a vehicle, where a front shielding plate 201 is arranged in the luggage compartment 2; the back door 1 for a vehicle includes a back door trim panel 140 and a rear shielding plate 101, the rear shielding plate 101 being provided with a first side edge 1011, a second side edge 1012, a third side edge 1013 and a fourth side edge 1014 that are sequentially connected, the first side edge 1011 being opposite the third side edge 1013, the second side edge 1012 being opposite the fourth side edge 1014, the first side edge 1011 and the third side edge 1013 being each connected to the back door trim panel 140 in a non-rotatable manner, a first connecting surface 1015 being delimited by a contour line of the rear shielding plate 101, a second connecting surface 1401 being delimited by a contour line of the back door trim panel 140, and the first connecting surface 1015 and the second connecting surface 1401 being arranged at a preset included angle; when the back door 1 for a vehicle is closed, the second side edge 1012 is in lap joint with the front shielding plate 201, to form a shielding plate of the luggage compartment 2; and when the back door 1 for a vehicle is opened, the second side edge 1012 is separated from the front shielding plate 201.

In the embodiment of the present application, the vehicle includes the back door 1 for a vehicle. A structure of the back door 1 for a vehicle refers to all manners of describing the back door 1 for a vehicle above. As shown in FIG. 1, the front shielding plate 201 is arranged in a luggage compartment 2, the rear shielding plate 101 is fixed on the back door 1 for a vehicle, when the back door 1 is closed, the rear shielding plate 101 is located at a horizontal position, the second side edge 1012 of the rear shielding plate 101 is in lap joint with the front shielding plate 201, and the front shielding plate 201 and the rear shielding plate 101 in lap joint form the shielding plate of the luggage compartment 2, to satisfy a requirement for shielding articles in the luggage compartment 2; and moreover, when the back door 1 is opened, the rear shielding plate 101 moves along with the back door 1, and the rear shielding plate 101 is separated from the front shielding plate 201, to conveniently take the articles. The rear shielding plate 101 is connected in such a manner, a mounting manner is firm and reliable, and disassembly is convenient. The space of the luggage compartment 2 is greatly utilized while convenience of shielding the articles and taking or placing the articles is satisfied.

What is described above is merely a preferred embodiment of the present application but not intended to limit the present application, and any modifications, equivalent replacements, improvements, etc. made within the spirit and principles of the present application should fall within the scope of protection of the present application.

What is claimed is:

1. A back door for a vehicle, comprising: a back door trim panel and a rear shielding plate, wherein
the rear shielding plate is provided with a first side edge, a second side edge, a third side edge and a fourth side edge that are sequentially connected, the first side edge is opposite the third side edge, and the second side edge is opposite the fourth side edge;
the second side edge is used for being in lap joint with a front shielding plate arranged in a luggage compartment of the vehicle, to form a shielding plate of the luggage compartment;
a first connecting surface is delimited by a contour line of the rear shielding plate, a second connecting surface is delimited by a contour line of the back door trim panel, and the first connecting surface and the second connecting surface are arranged at a preset included angle;

the first side edge and the third side edge are each detachably connected to the back door trim panel;

the back door trim panel comprises a window frame trim panel, the first side edge and the third side edge being each connected to the window frame trim panel;

the first side edge and the third side edge are each connected to the window frame trim panel by means of a first connector; and the first connector comprises a connecting plate, a supporting member and a fastener, the connecting plate being connected to the rear shielding plate, one end of the supporting member being connected to the connecting plate, and the fastener fixing the other end of the supporting member on the window frame trim panel.

2. The back door for a vehicle according to claim 1, wherein the back door trim panel further comprises a back door protection plate, the fourth side edge being connected to the back door protection plate.

3. A vehicle, comprising a luggage compartment and a back door for the vehicle, wherein a front shielding plate is arranged in the luggage compartment;

the back door for the vehicle comprises a back door trim panel and a rear shielding plate, the rear shielding plate being provided with a first side edge, a second side edge, a third side edge and a fourth side edge that are sequentially connected, the first side edge being opposite the third side edge, the second side edge being opposite the fourth side edge, a first connecting surface being delimited by a contour line of the rear shielding plate, a second connecting surface being delimited by a contour line of the back door trim panel, and the first connecting surface and the second connecting surface being arranged at a preset included angle;

when the back door for the vehicle is closed, the second side edge is in lap joint with the front shielding plate, to form a shielding plate of the luggage compartment;

when the back door for the vehicle is opened, the second side edge is separated from the front shielding plate;

the first side edge and the third side edge are each detachably connected to the back door trim panel;

the back door trim panel comprises a window frame trim panel, the first side edge and the third side edge being each connected to the window frame trim panel;

the first side edge and the third side edge are each connected to the window frame trim panel by means of a first connector; and the first connector comprises a connecting plate, a supporting member and a fastener, the connecting plate being connected to the rear shielding plate, one end of the supporting member being connected to the connecting plate, and the fastener fixing the other end of the supporting member on the window frame trim panel.

* * * * *